United States Patent
Parekh et al.

(10) Patent No.: US 11,169,856 B2
(45) Date of Patent: Nov. 9, 2021

(54) CONTAINER MANAGEMENT

(71) Applicant: Hewlett Packard Enterprise Development LP, Houston, TX (US)

(72) Inventors: Hardik Dhirendra Parekh, Bangalore (IN); Jaivish Kothari, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 117 days.

(21) Appl. No.: 16/263,476

(22) Filed: Jan. 31, 2019

(65) Prior Publication Data
US 2020/0250006 A1 Aug. 6, 2020

(51) Int. Cl.
G06F 9/44 (2018.01)
G06F 9/50 (2006.01)
G06F 3/06 (2006.01)
G06F 9/54 (2006.01)
H04L 29/08 (2006.01)

(52) U.S. Cl.
CPC ............ *G06F 9/5055* (2013.01); *G06F 3/067* (2013.01); *G06F 3/0607* (2013.01); *G06F 3/0659* (2013.01); *G06F 3/0665* (2013.01); *G06F 9/505* (2013.01); *G06F 9/5077* (2013.01); *G06F 9/545* (2013.01); *H04L 67/28* (2013.01)

(58) Field of Classification Search
CPC .... G06F 9/5055; G06F 3/0607; G06F 3/0659; G06F 3/0665; G06F 3/067; G06F 9/505; G06F 9/5077; G06F 9/545; H04L 67/28
See application file for complete search history.

(56) References Cited

U.S. PATENT DOCUMENTS

| | | | |
|---|---|---|---|
| 9,459,930 B1* | 10/2016 | Adogla | G06F 9/52 |
| 10,505,862 B1* | 12/2019 | Dhoolam | G06F 9/5061 |
| 2010/0186009 A1* | 7/2010 | Sen | G06F 8/61 |
| | | | 717/178 |

(Continued)

FOREIGN PATENT DOCUMENTS

| | | |
|---|---|---|
| AU | 2018100381 | 5/2018 |
| CN | 106850621 | 6/2017 |

OTHER PUBLICATIONS

Pary (Internet article: Run your Kubernetes Workloads on Amazon EC2 Spot Instances with Amazon EKS, dated Aug. 30, 2018; URL: https://aws.amazon.com/blogs/compute/run-your-kubernetes-workloads-on-amazon-ec2-spot-instances-with-amazon-eks/).*

(Continued)

*Primary Examiner* — Hang Pan
(74) *Attorney, Agent, or Firm* — Hewlett Packard Enterprise Patent Department

(57) ABSTRACT

In some examples, container management can include a non-transitory computer readable medium having instructions, the instructions executable by a processing resource to receive a deployment specification for operating the application within the container management system, determine whether the deployment specification includes a specified workload for scheduling the application, determine, in response to the deployment specification not including a specified workload for scheduling the application, a workload ratio associated with the application, determine a schedule in response to the determined workload ratio, and schedule the application across a plurality of nodes within the container management system based on the determined schedule.

18 Claims, 5 Drawing Sheets

(56) References Cited

U.S. PATENT DOCUMENTS

| | | | |
|---|---|---|---|
| 2012/0266168 A1* | 10/2012 | Spivak | H04L 47/70 718/1 |
| 2013/0346614 A1* | 12/2013 | Baughman | G06F 9/5083 709/226 |
| 2016/0378518 A1 | 12/2016 | Antony et al. | |
| 2017/0060609 A1 | 3/2017 | Cropper et al. | |
| 2018/0024860 A1* | 1/2018 | Balle | G06F 13/4068 718/104 |
| 2018/0241642 A1 | 8/2018 | Patel et al. | |

OTHER PUBLICATIONS

Amazon Web Services, "Amazon EC2 Instance Types", 2019, available online at <https://aws.amazon.com/ec2/instance-types/>, 16 pages.

Chunikhin, O.; "Implementing Advanced Scheduling Techniques with Kubernetes"; Apr. 27, 2018, 11 pages.

Kubernetes; "Managing Compute Resources for Containers"; printed on Sep. 6, 2018 from webpage: https://kubernetes.io/docs/concepts/configuration/manage-compute-resources-container/; 7 pages.

The Kubernetes Authors, "Kubernetes Scheduler", available online at <https://kubernetes.io/docs/concepts/scheduling-eviction/kube-scheduler/>, last modified on Oct. 22, 2020, 2 pages.

The Kubernetes Authors, "Scheduling Framework", available online at <https://kubernetes.io/docs/concepts/scheduling-eviction/scheduling-framework/>, last modified on Feb. 12, 2021, 4 pages.

The Kubernetes Authors, "Scheduling Policies", available online at <https://kubernetes.io/docs/reference/scheduling/policies/>, last modified on Sep. 17, 2020, 2 pages.

* cited by examiner

CONTAINER MANAGEMENT

BACKGROUND

For enterprise data storage, clustering can refer to the physical connection of independent compute nodes (servers) and a controlling function. The controlling function can distribute workloads to each node, manage the transfer of workloads between nodes, or both. Such clustering can include a shared storage system, along with a mechanism to duplicate the data in the storage system that is directly attached to each node that may be used. Common storage clustering applications provide failover capabilities for processes and enable load balancing for high-performance processes. Operation containerization can be an operating system (OS)-level virtualization method used to deploy and run distributed operations without launching an entire virtual machine (VM) for each operation. Multiple isolated operations run on an individual host and access the same OS kernel. For example, Container Linux (formerly CoreOS Linux) may be one of the first container operating systems built for containers. Software containers are a form of OS virtualization where the running container includes minimum operating system resources, memory, and services to run an operation.

DETAILED DESCRIPTION

Figure 1:
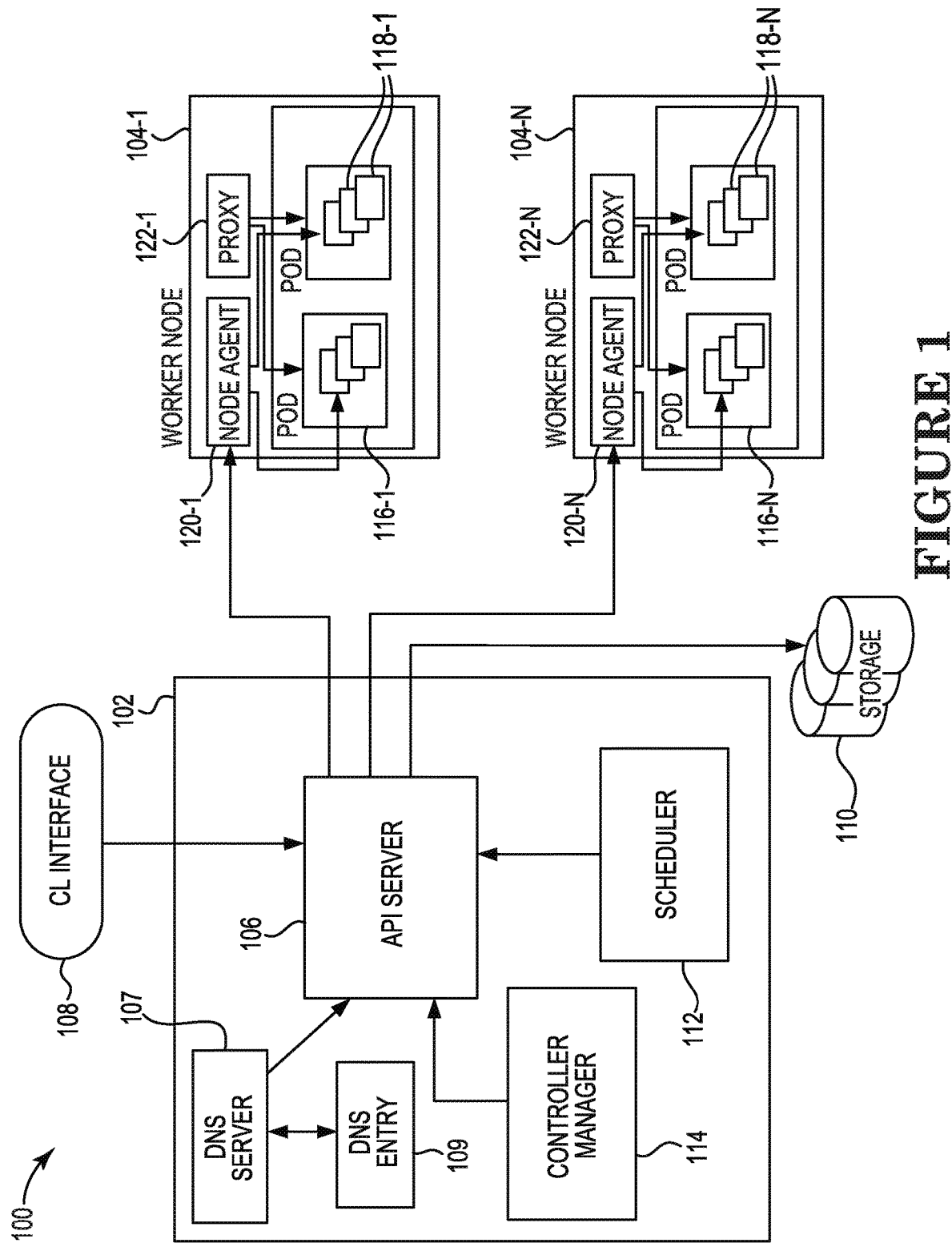
FIG. 1 is a schematic diagram of a container management system 100 consistent with the present disclosure.

A data center operating system, such as a Kubernetes container management system for example, can include a free and open source container management system that provides mechanisms for deploying, maintaining and scaling containerized management systems, such as a Kubernetes container management system for example. Such systems are intended to provide a platform for automating deployment, scaling, and operations of application containers across clusters of hosts and utilizes a command-line interface (CLI) that allows for running commands against clusters within the container management system. Commands can be defined that can be used to construct the CLI to manage a cluster, and to gather information from the commands so that cluster resources or services may be created, grouped, updated, and/or deleted. In this way, a container management system defines a set of building blocks or primitives that collectively provide mechanisms such as the CLI that deploy, maintain, and scale operations. The container management system is extensible to meet different workloads. This extensibility is provided in large part by an application programming interface (API), which is used by internal components as well as extensions and containers that run on container management system.

The basic scheduling unit of a container management system is a pod, which adds a higher level of abstraction by grouping containerized components. A pod is formed of containers that are guaranteed to be co-located on the host machine and can share resources. Each pod in the container management system is assigned a unique IP address within a cluster, which allows the operations to use ports without the risk of conflict. A pod can define a volume, such as a local disk directory or a network disk, and expose it to the containers in the pod. Pods can be managed manually through the API, or their management can be delegated to a controller.

Further, a container management system may include a portable, extensible open-source platform for managing containerized workloads and services to provide a container-centric management environment and orchestrate computing, networking, and storage infrastructure on behalf of user workloads. A container management system may include assigning a unique IP to each container in a container management system that is addressable by any other container within a cluster of hosts. All operations and communications between components, and external user commands, are made using representational state transfer (REST) commands transmitted via an application programming interface (API). An API server receives the transmitted REST commands. Consequently, each object in the container management system platform is treated as an API object and has a corresponding entry if the API. API objects are used to describe a state of a cluster, including the operations or other workloads that are to run, what container images they use, the number of replicas, what network and disk resources to make available, and so forth. The state is set by creating objects using the API, typically via the command-line interface. The API may also be used directly to interact with the cluster and set or modify your state.

In a container management system, managed environment scheduling of newly added workloads may be based on labels and node-selectors that may be included within a deployment specification. One such label may be included to indicate the instance of workload for the associated node on which the application should be placed. For example, there are four instances of workload included as part of the Amazon Web Services (AWS)-general purpose, computing optimized, memory optimized, and elastic block store (EBS) optimized. Therefore, a deployment specification may include a workload label that specifies the use of either a general purpose workload, a computing optimized workload, a memory optimized workload or an EBS optimized workload, which is a volume that provides persistent block storage volumes for use with instances within the Amazon web services (EWB) cloud. However, in instances where there is no label included indicating a given workload instance for an application, there is no way to determine which workload instance may be best suited for the application and therefore on which associated node the application should optimally be placed.

Therefore, the present disclosure relates to determining the instance of workload for the associated node on which the application should be placed when there is no indication of the desired workload instance included in the deployment specification for the application. For example, in order to determine the optimal workload instance for the associated node on which an application should be placed, the memory to CPU ratio is calculated and scheduling is determined based on the ratio. For example, if the ratio is high, the pod is scheduled to memory optimized instances, if the ratio is low, the pod is scheduled to compute optimized instances, and if the ratio is within a predetermined range between high and low, the pod is scheduled to EBS optimized instances. A determination of the associated node on which the application should be placed is then determined based on the determined schedule. In instances where a specific workload indication (computing optimized, memory optimized, or EBS optimized) is included by the user within the specification, the pod is scheduled to the indicated instance associated with the workload.

FIG. 1 is a schematic diagram of a container management system 100 consistent with the present disclosure. As illustrated in the example of FIG. 1, a container management system 100 according to the present disclosure, which may be a kubernetes container management system for example, may include a master node 102, which is responsible for managing the container management system 100, and multiple worker nodes 104-1, . . . , 104-N (hereinafter referred to collectively as worker nodes 104) within which the services of the container management system 100 are operating to perform a requested operation. Examples of such requested operations can include operations such as create deployment, delete deployment, update deployment, and so forth. While two worker nodes 104 are illustrated in FIG. 1 for brevity sake, it is understood that the container management system 100 may include more than two worker nodes 104 (e.g., such as N number of worker nodes 104).

The master node 102 can be the entry point of all administrative tasks for the container management system 100 and may be responsible for orchestrating worker nodes 104, within which the services of the container management system 100 for generating an operation or application are located. The master node 102 includes an API server 106 that provides both the internal and external interface access to the container management system via the master node 102. The API server 106 receives commands, known as representational state transfer (REST) commands, from a command line (CL) interface 108 tool, such as a kubectl command line interface for example. The REST commands provide a set of architectural constraints that, when applied as a whole, emphasize scalability of component interactions, generality of interfaces, independent deployment of components, and intermediary components. The API server 106 processes the REST command requests, validates the commands, and executes the logic within the commands.

The results of the REST commands processed by the API server 106 are stored in a storage component 110, such as an etcd storage component for example, included within the master node 102. The storage component 110 reliably stores configuration data of the data management system 100, representing the state of the container management system 100 (i.e., what nodes exist, what pods should be running, which nodes should they be running on, etc.). The storage component 110 is a distributed, key value storage used for shared configuration and service directory. The storage component 110 provides storage for REST commands received by the API server 106 to perform create-update-and-delete (CRUD) operations as well as an interface to register watchers on specific nodes, thereby providing a reliable way to notify the rest of the container management system 100 about configuration changes within the container management system 100. For example, the shared information in the storage component 110 enables the API server 106 to notify the entire system 100 about configuration changes such as jobs being scheduled, created and deployed, pod/service details and state, name spaces and replication information, and so forth.

The master node 102 also includes a resource scheduler 112 and a controller manager 114. The resource scheduler 112 can be included in the master node 102 to deploy pods and services onto the nodes 104. The resource scheduler 112 includes information regarding available resources on the container management system 100, as well as resources utilized for the services to run. As a result, the resource scheduler 112 makes decisions on where to deploy a specific service or application. The controller manager 112 uses the API server 106 to watch the shared state of the container management system 100. For example, the API server 106 can make corrective changes to the current state of the container management system 100 to change the current state to another state, re-create a failed pod or remove an extra-scheduled pod. In addition, the master node 112 can include a DNS server 107, such as a for example, which schedules the DNS pod and services on the container management system 100, and configures the kubelets to instruct individual containers to use the DNS service's IP to resolve DNS names or entries 109.

Pods 116-1, . . . , 116-N (hereinafter referred to collectively as pods 116) are co-located in each of the worker nodes 104, and containers 118-1, . . . , 118-N (hereinafter referred to collectively as containers 118) reside within each of the pods 116. The containers 118 are co-located on the host machine (machine where containers are running, i.e., worker node), and can share resources. The pods 116, which are the basic scheduling unit in Kubernetes, add a higher level of abstraction by grouping containerized components that share resources, such as storage, Linux namespaces, cgroups, IP addresses, and so forth. Each of the pods 116 is assigned a unique IP address within the container management system 100, which allows applications to use ports without the risk of conflict. Each of the pods 116 can define a volume, such as a local disk directory or a network disk, and expose the volume to the containers 118 within the pods 116. The pods 116 may be managed manually through the API server 106, or the management of the pods 116 may be delegated to a controller.

The containers 118 hold the running operation along with the libraries and components or services to run the software executed to perform an operation. These components include files, environment variables, dependencies and libraries. The host operating system (operating system running on the node. i.e., container) constrains access of the containers 118 to physical resource, such as CPU, storage and memory, so that an individual container, such as container 118-1, cannot take up all of a host's physical resources. A guest host operating system, on the other hand, includes instructions installed on either a virtual machine or partitioned disk that describes an operating system that is different than the host operating system. Therefore, a host operating system is installed on a computer and interacts with underlying hardware, while a guest operating system is located on a virtual machine.

The pods 116 included in an individual worker node 104 are created, destroyed and re-created, based on the state of the server and the service itself, and therefore are not intended to continue to exist for a long period of time. Because of the relatively short lifespan of the pods 116, the IP address that they are served on may change, making the communication of the associated microservices difficult. Therefore, Kubernetes has introduced the concept of a service, which is an abstraction on top of pods 116, typically using a proxy in order to be run on top of the services in order for other services to communicate via a virtual IP address. As a result, load balancing may be set up for numerous pods 116 so that the pods may be exposed via a service or application. The pods 116 can be recreated and have changes to their corresponding IP protocol. Therefore, services are created having stable IP and DNS names which can be used by other pods to communicate with the pod. For example, consider an image-processing backend which is running with three replicas. Those replicas are fungible-frontends do not care which backend they use. While the actual pods that compose the backend set may change, the frontend clients should not have to be aware of those changes and/or to keep track of a list of the backends. Each of the services within the containers 118 of the container management system 100 is assigned a domain name service (DNS) name that includes a name identifying the pod 116 within which the service resides, along with a portion of the DNS name that identifies the name of the service.

Each of the worker nodes 104 includes a node agent, such as a kubelet for example, (e.g., worker node 104-1 includes node agent 120-1, hereinafter the node agents 120-1, . . . , 120-N are referred to collectively as node agents 120) and a proxy, such as a kube-proxy for example, (e.g., worker node 104-1 includes proxy 122-1, hereinafter the proxies 122-1, . . . , 122-N are referred to collectively as proxies 122)). A node agent 120 is in communication with the master node 102 and receives details for the configuration of the pods 116 from the API server 106. The node agent 120 uses the received details to ensure that the constructed containers 118 are operating as intended. In addition, the node agent 120 may also receive information about specific services from the storage 110 to obtain information related to services and to create details related to newly created services.

Each of the proxies 122 function as a network proxy, or hub through which requests are transferred, and as a load balancer for a service on an individual worker node 104 which acts as a reverse proxy and distributes network or operation traffic across servers. The load balancer is used to increase capacity (concurrent users) and reliability of operations and perform network routing for transmission control protocol (TCP) and user data protocol (UDP) packets. The proxies 122 are responsible for routing traffic to the appropriate container 118 in order to enable access to services based on an IP address and numbering of an incoming request for creating an operation.

In this way, the resources of the worker nodes 104 may be combined together and identified so that when an operation or program is to be created or deployed, the program or services for creating and running the service are located throughout the individual worker nodes 104. If any of the nodes 104 are added or removed, the container management system 100 is able to create or deploy the programs or services by combining resources from different nodes 104 or using a combination of different services within the nodes 104.

In order to deploy containerized operations in a containerized management system, such as a Kubernetes system, for example, a deployment configuration for providing instructions on how to create and update services for creating a given operation can be input to the master node 102 via a CL interface 108, such as a kubectl command line interface for example. Once the instructions on how to create and update services for creating a given operation have been received by the master node 102, the API server 106 of the master node 102 schedules the operation onto individual worker nodes 104 to create the operation using a combination of multiple different services within multiple different containers 118 of multiple different pods 116 of the system 100. In this way, the operation is created using a combination of services located in multiple containers 118 located within one or more pods 116 within one or more worker nodes 104.

Once the operation has been created and scheduled, the master node 102 continuously monitors the pods 116. If the master node 102 determines that a service used for the operation located within one of the containers 118 of the pods 116 goes down or is deleted, the master node 102 replaces the deleted or nonoperating pod associated with the operation using a different combination of the currently available services within the containers 118 of the pods 116 of the container management system 100. In this way, the API server 106 monitors the functionality of the pods 116, and when the pods 116 no longer functions as intended, recreates the pod 116.

Figure 2:
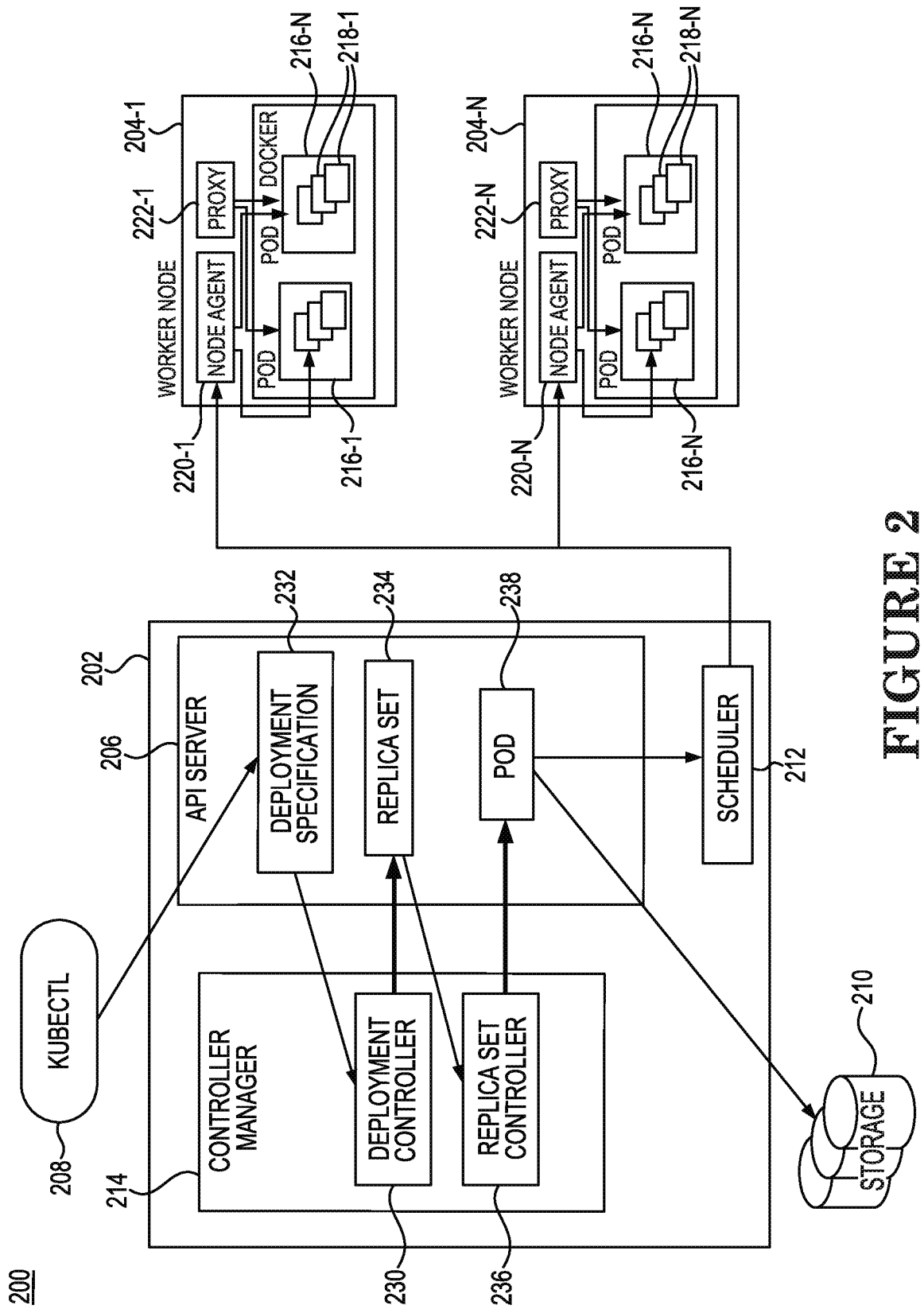
FIG. 2 is a schematic diagram of a container management system 200 consistent with the present disclosure in more detail.

FIG. 2 is a schematic diagram of a container management system 200 consistent with the present disclosure in more detail. As illustrated in the example of FIG. 2, a container management system 200 according to the present disclosure, which may be a kubernetes management system, for example, may include a master node 202, and multiple worker nodes 204-1, . . . , 204-N (hereinafter referred to collectively as worker nodes 204) within which the services of the container management system 200 are operating to perform a requested operation. Examples of such requested operations can include operations such as create deployment, delete deployment, update deployment, and so forth. While two worker nodes 204 are illustrated in FIG. 2 for brevity sake, it is understood that the container management system 200 may include more than two worker nodes 204 (e.g., such as N number of worker nodes 204).

As described above, the master node 202 can be the entry point of all administrative tasks for the container management system 200 and may be responsible for orchestrating one or more worker nodes 204, within which the services of the container management system 200 for generating an operation are located. The master node 202 includes an API server 206 that provides both the internal and external interface access to the container management system via the master node 202. The API server 206 receives commands, known as representational state transfer (REST) commands, from a command line (CL) interface 208 tool, such as a kubectl command line interface for example. The REST commands provide a set of architectural constraints that, when applied as a whole, emphasize scalability of component interactions, generality of interfaces, independent deployment of components, and intermediary components. The API server 106 processes the REST command requests, validates the commands, and executes the logic within the commands.

The results of the REST commands processed by the API server 206 are stored in a storage component 210, such as an etcd storage component for example, included either within or separate from the master node 202. The storage component 210 reliably stores configuration data representing the state of the nodes 204 (i.e., what nodes exist, what pods should be running, which nodes should they be running on, etc.). The storage component 210 may be a distributed, key value storage mainly used for shared configuration and service directory. The storage component 210 provides storage for REST commands received by the API server 206 to perform create-update-and-delete (CRUD) operations as well as an interface to register watchers on specific nodes, thereby providing a reliable way to notify the rest of the container management system 200 about configuration changes within the container management system 200. For example, the shared information in the storage component 210 enables the API server 206 to notify the entire container management system 200 about configuration changes such as jobs being scheduled, created and deployed, pod/service details and state, name spaces and replication information, and so forth.

The master node 202 also includes a resource scheduler 212 and a controller manager 214. The resource scheduler 212 can be included in the master node 202 to deploy pods and services onto the nodes 204. The resource scheduler 212 includes information regarding available resources, as well as resources utilized for the services to run. As a result, the resource scheduler 212 makes decisions on where to deploy a specific service or application. The API server 206 evaluates the shared state of the container management system 200. For example, the controller manager 212 can make corrective changes to the current state of the container management system 200 to change the current state to another state, re-create a failed pod or remove an extra-scheduled pod. In addition, the master node 212 can include a DNS server (not shown in FIG. 2), such as a for example, which schedules the DNS pod and services on the container management system 200, and configures the kubelets to instruct individual containers to use the DNS service's IP to resolve DNS names.

Pods 216-1, . . . , 216-N (hereinafter referred to collectively as pods 216) are co-located in each of the worker nodes 204, and one or more containers 218-1, . . . , 218-N (hereinafter referred to collectively as containers 218) reside within each of the pods 216. The containers 218 are co-located on the host machine (machine where containers are running, i.e., worker node), and can share resources. The pods 216, which are the basic scheduling unit in Kubernetes, add a higher level of abstraction by grouping containerized components that share resources, such as storage, Linux namespaces, cgroups, IP addresses, and so forth. Each of the pods 216 is assigned a unique IP address, which allows applications to use ports without the risk of conflict. Each of the pods 216 can define a volume, such as a local disk directory or a network disk, and expose the volume to the containers 218 within the pods 216. The pods 216 may be managed manually through the API server 206, or the management of the pods 216 may be delegated to a controller.

The containers 218 hold the running operation along with the libraries and components or services to run the software executed to perform an operation. These components include files, environment variables, dependencies and libraries. The host operating system (operating system running on the node. i.e., container) constrains access of the containers 218 to physical resource, such as CPU, storage and memory, so that an individual container, such as container 218-1, cannot take up all of a host's physical resources. A guest host operating system, on the other hand, includes instructions installed on either a virtual machine or partitioned disk that describes an operating system that is different than the host operating system. Therefore, a host operating system is installed on a computer and interacts with underlying hardware, while a guest operating system is located on a virtual machine.

The pods 216 included in an individual worker node 204 are created, destroyed and re-created, based on the state of the server and the service itself, and therefore are not intended to continue to exist for a long period of time. Because of the relatively short lifespan of the pods 216, the IP address that they are served on may change, making the communication of the associated microservices difficult. Therefore, Kubernetes has introduced the concept of a service, which is an abstraction on top of pods 216, typically using a proxy in order to be run on top of the services in order for other services to communicate via a virtual IP address. As a result, load balancing may be set up for numerous pods 216 so that the pods may be exposed via a service. The pods 216 can be recreated and have changes to their corresponding IP protocol. Therefore, services are created having stable IP and DNS names which can be used by other pods to communicate with the pod. For example, consider an image-processing backend which is running with three replicas. Those replicas are fungible-frontends do not care which backend they use. While the actual pods that compose the backend set may change, the frontend clients should not have to be aware of those changes and/or to keep track of a list of the backends. As mentioned, each of the services within the containers 218 is assigned a domain name service (DNS) name that includes a name identifying the pod 216 within which the service resides, along with a portion of the DNS name that identifies the name of the service.

As mentioned, each of the worker nodes 204 includes a node agent, such as a kubelet for example, (e.g., worker node 204-1 includes node agent 220-1, hereinafter the node agents 220-1, . . . , 220-N are referred to collectively as node agents 220) and a proxy, such as a kube-proxy for example, (e.g., worker node 204-1 includes proxy 222-1, hereinafter the proxies 222-1, . . . , 222-N are referred to collectively as proxies 222)). A node agent 220 is in communication with the master node 202 and receives details for the configuration of the pods 216 from the API server 206. The node agent 220 uses the received details to ensure that the constructed containers 218 are operating as intended. In addition, the node agent 220 may also receive information about specific services from the storage 210 to obtain information related to services and to create details related to newly created services.

As mentioned, each of the proxies 222 function as a network proxy, or hub through which requests are transferred, and as a load balancer for a service on an individual worker node 204 which acts as a reverse proxy and distributes network or operation traffic across servers. The load balancer is used to increase capacity (concurrent users) and reliability of operations and perform network routing for transmission control protocol (TCP) and user data protocol (UDP) packets. The proxies 222 are responsible for routing traffic to the appropriate container 218 in order to enable access to services based on an IP address and numbering of an incoming request for creating an operation.

In this way, the resources of the worker nodes 204 may be combined together and identified so that when an operation or program is to be created or deployed, the program or services for creating and running the service are located throughout the individual worker nodes 204. If any of the nodes 204 are added or removed, the master node 202 is able to create or deploy the programs or services by combining resources from different nodes 204 or using a combination of different services within the nodes 204.

To deploy containerized operations in a containerized management system, such as a Kubernetes system, for example, may utilized a deployment configuration. The deployment configuration provides instructions on how to create and update services for creating a given operation can be input to the master node 202 via a command line interface 208, such as a kubectl command line interface for example.

Once the instructions on how to create and update services for creating a given operation have been received by the master node 202, the API server 206 of the master node 202 schedules the operation onto individual worker nodes 204 to create the operation using a combination of multiple different services within multiple different containers 218 of multiple different pods 216 of the container management system 200. In this way, the operation is created using a combination of services located in multiple containers 218 located within one or more pods 216 within one or more worker nodes 204.

Once the operation has been created and scheduled, the master node 202 continuously monitors the pods 216. If the master node 202 determines that a service used for the operation located within the containers 218 of the pods 216 goes down or is deleted, the master node 202 replaces the deleted or nonoperating pod associated with the operation using a different combination of the currently available services within the containers 218 of the pods 216 of the container management system 200. In this way, the API server 206 monitors the functionality of the pods 216, and when the pods 216 no longer functions as intended, recreates the pod 216.

As further illustrated in FIG. 2, the controller manager 214 includes a deployment controller 230 that provides declarative updates for the pods 216 based on the content of a deployment specification 232 associated with an application received from a user at the API server 206 via CL interface 208 received from a user. For example, the deployment specification 232 may contain logic for handling deployment of applications and serve as part of a managed environment scheduling of newly added workloads to the container management system 200 that may be based on labels and node-selectors that included within a deployment specification 232. One such label may be included to indicate the instance of workload for the associated node on which the application should be placed. For example, there are four instances of workload included as part of the AWS-general purpose, computing optimized, memory optimized, and EBS optimized. Therefore, the deployment specification 232 may include a workload label that specifies the use of either a general purpose workload, a computing optimized workload, a memory optimized workload or an EBS optimized workload for the application.

The deployment controller 230 creates a replica set 234 describing the number of pods a specification should have within the API server 206 associated with the deployment specification 232, which provide redundancy by providing multiple versions of an application so that issues may be prevented if a version of the application fails. By having multiple replica sets 234 or versions of a container 218 within the pods 216 enables traffic to more easily be sent to different instances or containers 218 to prevent overloading of an individual instance or pod 216. A replica set controller 236 generates a pod specification 238 indicating how to run the containers 218 within the pod 216 including a list of containers 218. The pod specification 238 is then utilized by the resource scheduler to determine scheduling of an application across the nodes 204 within the container management system 200, as described below.

Figure 3:
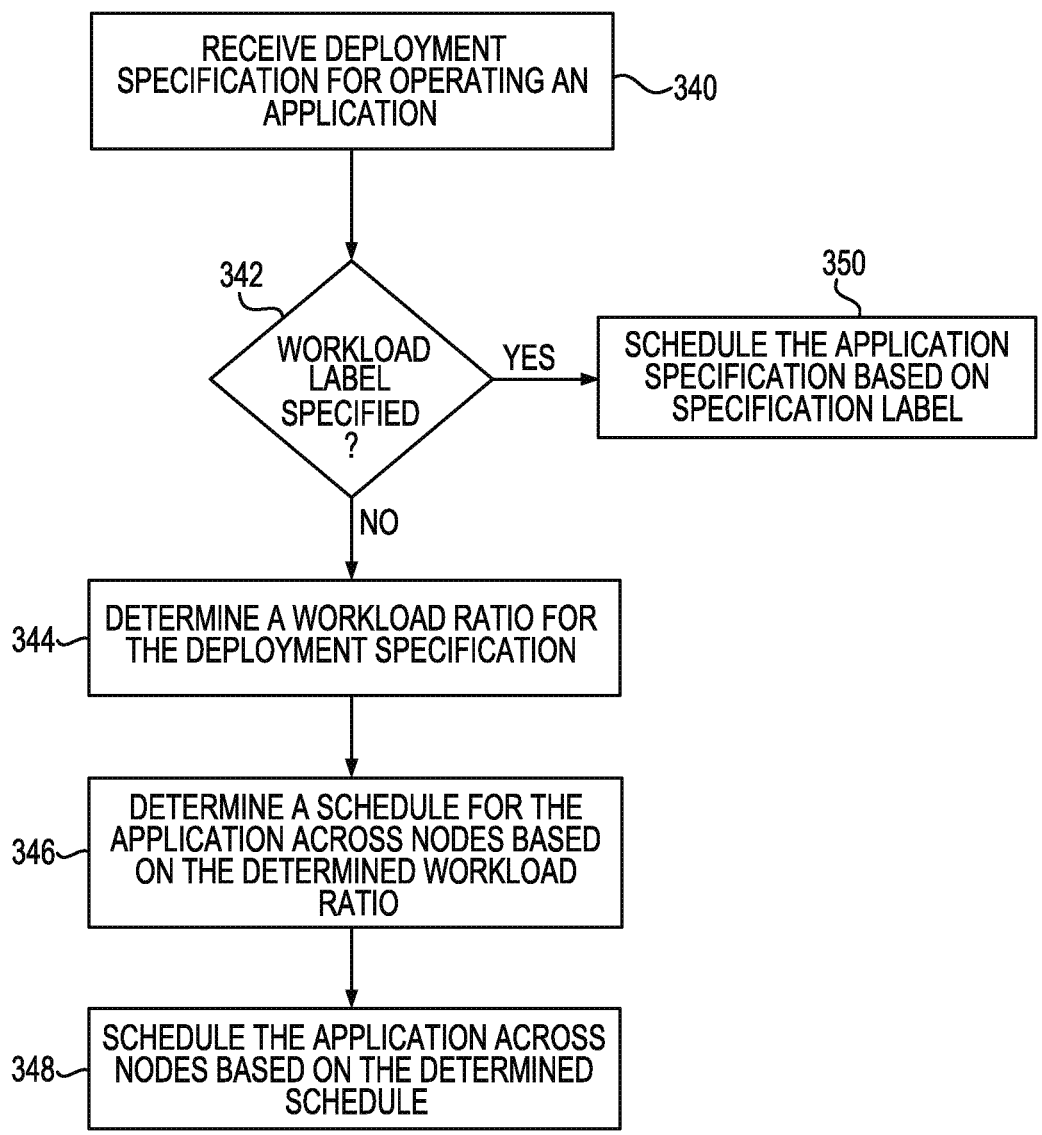
FIG. 3 is a flowchart of an example method 300 of scheduling an application in a container management system consistent with the present disclosure.

FIG. 3 is a flowchart of an example method 300 of scheduling an application in a container management system consistent with the present disclosure. When a user inputs a command including a deployment specification for operating an application within the container management system via the CL interface to create an application (Block 340), a determination is made at Block 342 as to whether the deployment specification includes a workload label specifying the workload associated with the application. For example, there are four instances of workload included as part of the AWS-general purpose, computing optimized, memory optimized, and EBS optimized. Therefore, the deployment specification may include a workload label that specifies the use of either a general purpose workload, a computing optimized workload, a memory optimized workload or an EBS optimized workload for the application.

If the deployment specification does not include a specified workload, No in Block 342, the resource scheduler determines a workload ratio for the application associated with the deployment specification, Block 344. At Block 346, a schedule for the application across nodes of the container management system is determined based on the determined workload ratio, and, at Block 348, the application is scheduled across nodes of the computer management system based on the determined schedule. For example, if the determined workload ratio is associated with the application requiring a computing optimized workload deployment, the most optimized nodes of the container management system for such an application are utilized. In the same way, if the determined workload ratio is associated with the application requiring a memory optimized workload deployment, the most optimized nodes of the container management system for such an application are utilized, and if the determined workload ratio is associated with the application requiring an EBS optimized workload deployment, the most optimized nodes of the container management system for such an application are utilized.

On the other hand, at Block 350, if it is determined that a workload is specified within the deployment specification, Yes in Block 342, the application is scheduled across nodes of the computer management system based on the workload specified in the deployment specification so that the most optimized nodes of the container management system for such an application are utilized. In this way, the container management system of the present disclosure is able to determine the pods on which an application is to be scheduled based either upon the requirements specifically specified by the user, or based upon subsequently determined resource requirements associated with the application when specific workload requirements are not specifically specified by the user in a deployment specification for operating the application.

Figure 4:
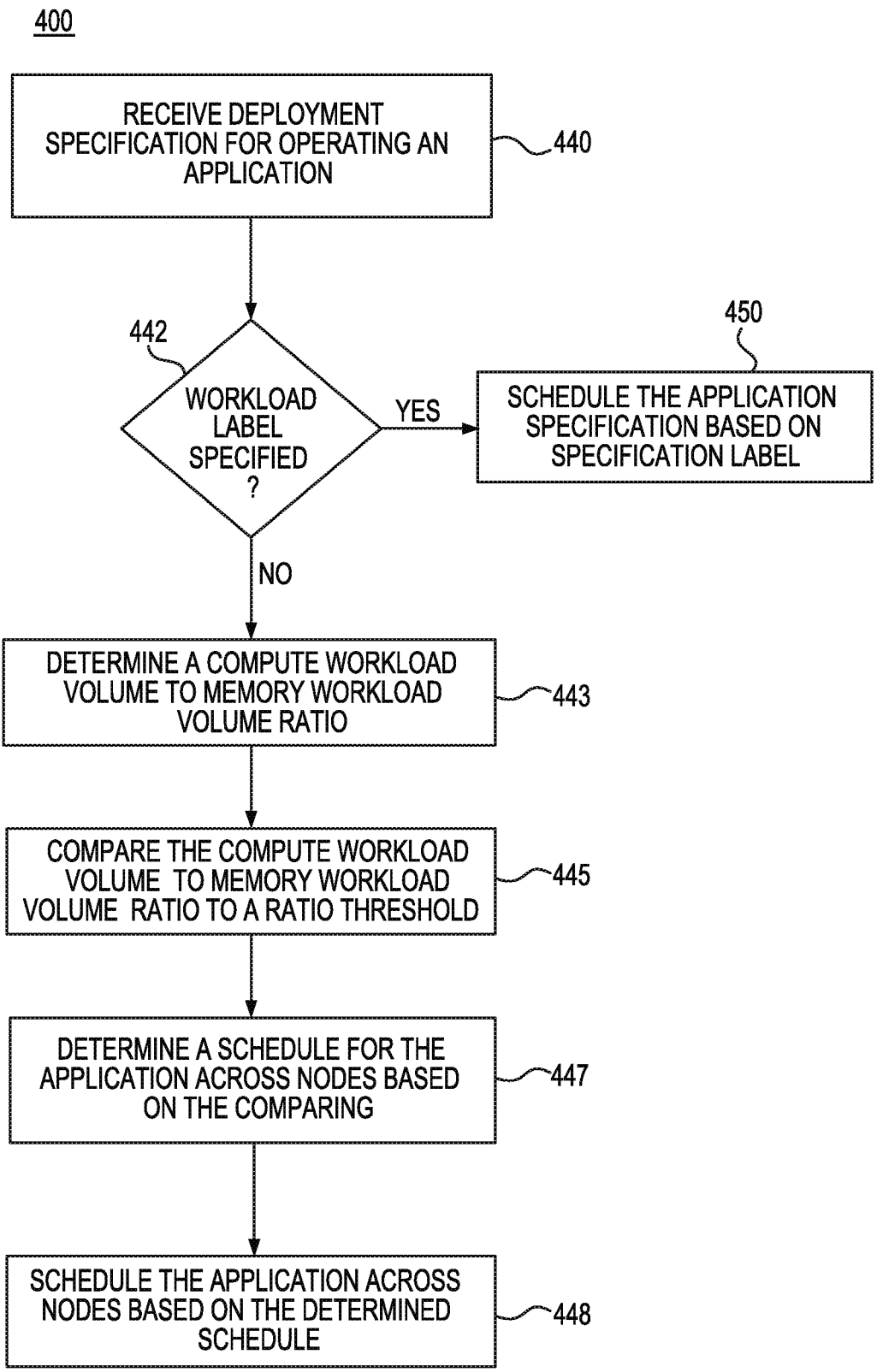
FIG. 4 is a flowchart of an example method 400 of scheduling an application in a container management system consistent with the present disclosure.

FIG. 4 is a flowchart of an example method 400 of scheduling an application in a container management system consistent with the present disclosure. During scheduling of an application in a container management system according to some examples, a deployment specification for operating an application is received at Block 440. At Block 442, a determination is made as to whether the deployment specification includes a specified workload indicating the instance of workload for the associated node on which the application should be placed. If the deployment specification does not include a specified workload, No in Block 442, the resource scheduler calculates a compute workload for the application and a memory workload for the application and calculates the ratio of the two workloads.

For example, at Block 443, the resource scheduler determines a compute workload to memory workload ratio for the application. At Block 445, the resource scheduler compares the compute workload to memory to memory workload ratio to a ratio threshold, as described in FIG. 5 below for example. The resource scheduler determines, at Block 447, a schedule across nodes of the container management system for the application based on the results of the comparison of the compute workload to memory to memory workload ratio to the ratio threshold, and, at Block 448, schedules the application across nodes of the computer management system based on the determined schedule. For example, if the determined schedule is associated with the application requiring a computing optimized workload deployment, the most optimized nodes of the container management system for such an application are utilized. In the same way, if the determined schedule is associated with the application requiring a memory optimized workload deployment, the most optimized nodes of the container management system for such an application are utilized, and if the determined schedule is associated with the application requiring an EBS optimized workload deployment, the most optimized nodes of the container management system for such an application are utilized.

On the other hand, at Block 450, if it is determined that a workload is specified within the deployment specification, Yes in Block 442, the application is scheduled across nodes of the computer management system based on the workload specified in the deployment specification so that the most optimized nodes of the container management system for such an application are utilized. In this way, the container management system of the present disclosure is able to determine the pods on which an application is to be scheduled based either upon requirements specifically specified by the user or based upon subsequently determined resource requirements associated with the application when specific workload requirements are not specifically specified by the user in a deployment specification for operating the application.

Figure 5:
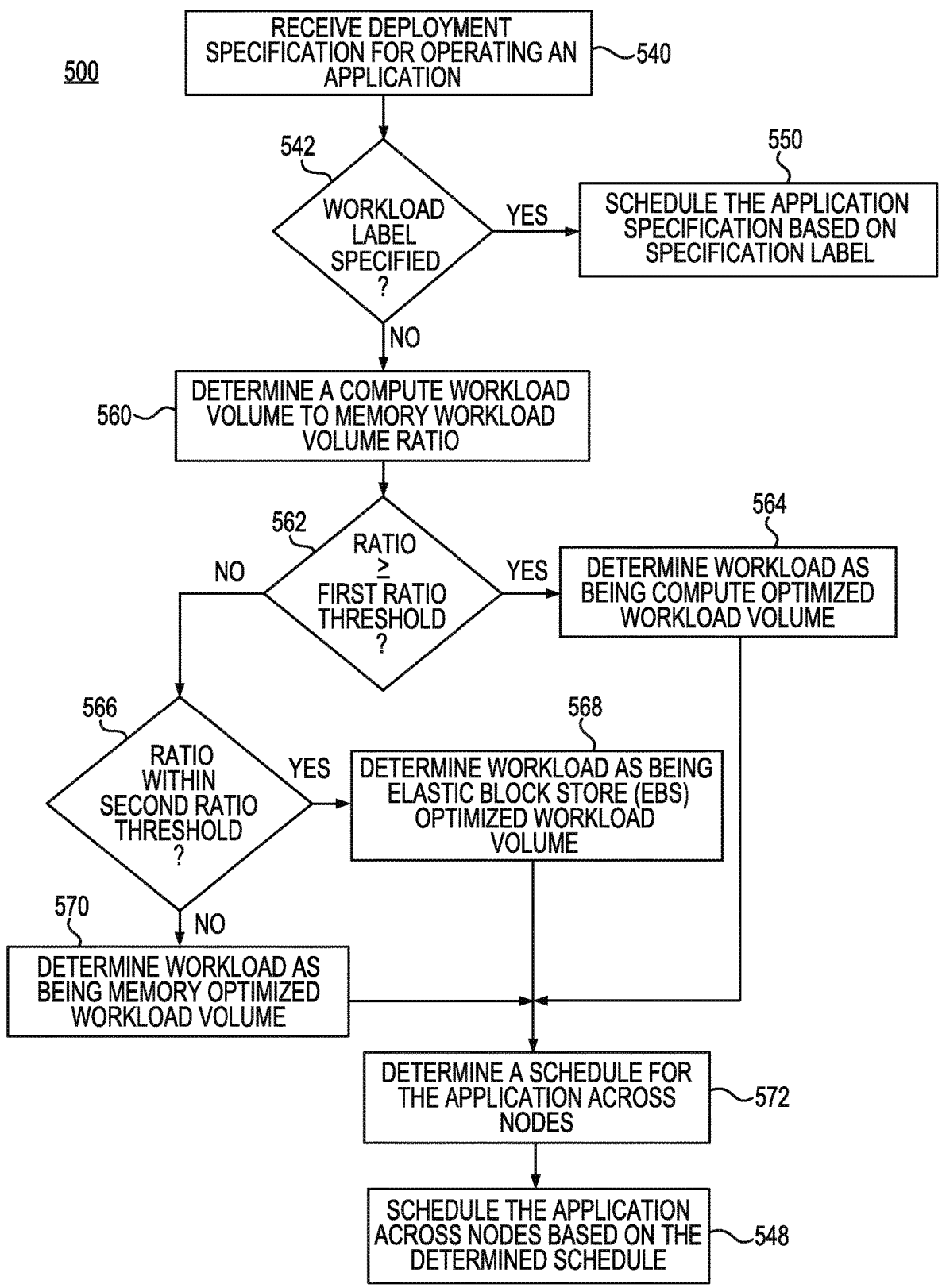
FIG. 5 is a flowchart of an example method 500 of scheduling an application in a container management system consistent with the present disclosure.

FIG. 5 is a flowchart of an example method 500 of scheduling an application in a container management system consistent with the present disclosure. During scheduling of an application in a container management system according to some examples, a deployment specification for operating an application is received at Block 540. At Block 542, a determination is made as to whether the deployment specification includes a specified workload indicating the instance of workload for the associated node on which the application should be placed.

If the deployment specification does not include a specified workload, No in Block 542, the resource scheduler calculates a compute workload for the application and a memory workload for the application and calculates the ratio of the two workloads. For example, at Block 543, the resource scheduler determines the ratio of the compute workload to the memory workload for the application. At Block 562, the resource scheduler determines whether the ratio is greater than or equal to a first ratio threshold. In some examples, the first ratio threshold may be a predetermined fraction, such as 0.45 for example. If the ratio is determined to be greater than or equal to the first ratio threshold, Yes in Block 562, the resource scheduler determines that the workload for the application is a computing optimized workload, Block 564. When the workload for the application is determined to be a computing optimized workload, Block 564, the resource scheduler determines, at Block 572, a schedule across nodes of the container management system for the application based on the determination that the workload for the application is a computing optimized workload, and at Block 548, schedules the application across nodes of the computer management system based on the determined schedule.

If the ratio is not determined to be greater than or equal to the first ratio threshold, No in Block 562, the resource scheduler determines at Block 566, whether the ratio is within a second ratio threshold. In some examples, the second ratio threshold may be a predetermined range, such as between a range of 0.45 and 0.20 for example. If the ratio is determined to be within the second ratio threshold, Yes in Block 566, the resource scheduler determines that the workload for the application is an EBS optimized workload, Block 568. The resource scheduler determines, at Block 572, a schedule across nodes of the container management system for the application based on the determination that the workload for the application is an EBS optimized workload, and at Block 548, schedules the application across nodes of the computer management system based on the determined schedule.

On the other hand, if the ratio is not determined to be within the second ratio threshold, No in Block 566, the resource scheduler determines that the workload for the application is a memory optimized workload, Block 578. The resource scheduler determines, at Block 572, a schedule across nodes of the container management system for the application based on the determination that the workload for the application is a memory optimized workload, and at Block 548, schedules the application across nodes of the computer management system based on the determined schedule.

In this way, the container management system of the present disclosure is able to determine the pods on which an application is to be scheduled based either upon the requirements specified by the user or based upon subsequently determined resource requirements associated with the application when specific workload requirements are not specifically specified by the user in a deployment specification for operating the application.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. For example, reference numeral 112 refers to element "112" in FIG. 1 and an analogous element may be identified by reference numeral 212 in FIG. 2. Analogous elements within a Figure may be referenced with a hyphen and extra numeral or letter. See, for example, elements 120-1, and 112-N in FIG. 1. Such analogous elements may be generally referenced without the hyphen and extra numeral or letter. For example, elements 121-1 and 121-N may be collectively referenced as 121. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed is:

1. A non-transitory computer readable medium having instructions, the instructions executable by a processing resource to:
    receive, from an application programming interface (API) server, a deployment specification for operating an application within the container management system;

determine whether the deployment specification includes a workload label for scheduling the application;

in response to the deployment specification not including a workload label for scheduling the application, determine a workload ratio associated with the application and determine a schedule based on the determined workload ratio;

in response to the deployment specification including the workload label, determine the schedule based on the workload label; and schedule the application across a plurality of nodes within the container management system based on the determined schedule, wherein each node of the plurality of nodes is a machine with physical hardware resources.

2. The medium of claim 1, wherein the instructions to determine the workload ratio and determine the schedule in response to the deployment specification not including the workload label include instructions executable by the processing resource to:

determine, as the workload ratio, a compute workload to memory workload ratio associated with the application;

compare the compute workload to memory workload ratio to a ratio threshold; and determine the schedule as being associated with one of a computing optimized workload, a memory optimized workload, and an elastic block (EBS) workload in response to the comparing.

3. The medium of claim 1, wherein the instructions to determine the workload ratio and determine the schedule in response to the deployment specification not including the workload label include instructions executable by the processing resource to:

determine, as the workload ratio, a compute workload to memory workload ratio associated with the application;

determine whether the compute workload to memory workload ratio is greater than or equal to a first ratio threshold; and determine the schedule as being associated with a computing optimized workload in response to the compute workload to memory workload ratio being greater than or equal to the first ratio threshold.

4. The medium of claim 3, wherein the instructions to determine the workload ratio and determine the schedule in response to the deployment specification not including the workload label include instructions executable by the processing resource to:

determine whether the compute workload to memory workload ratio is within a second ratio threshold; and determine the schedule as being an elastic block store (EBS) workload in response to the compute workload to memory workload ratio being within the second ratio threshold.

5. The medium of claim 4, wherein the instructions to determine the workload ratio and determine the schedule in response to the deployment specification not including the workload label include instructions executable by the processing resource to determine the schedule as being a memory optimized workload in response to both the compute workload to memory workload ratio not being greater than or equal to the first ratio threshold and the compute workload to memory workload ratio not being within the second ratio threshold.

6. The medium of claim 1, wherein types of the workload label are general purpose workload, computing optimized workload, memory optimized workload, and elastic block store optimized workload.

7. The medium of claim 1, wherein the workload ratio is determined as a ratio of compute workload to memory workload associated with the application, and the schedule for the application is determined by comparing the workload ratio to multiple ratio thresholds, and the scheduling assigned one of multiple workload types that correspond respectively to outcomes of the comparing.

8. The medium claim 5, wherein the first ratio threshold is a predetermined percentage and the second ratio threshold is a range between two predetermined percentages.

9. A container management system, comprising:

a plurality of nodes, each node of the plurality of nodes being a machine with physical hardware resources and each node of the plurality of nodes comprising a plurality of pods;

an application programming interface server to receive a deployment specification for operating an application within the container management system;

a deployment controller on a master node of the plurality of nodes to generate a replica set associated with the deployment specification;

a replica set controller on the master node to generate a pod specification based on the generated replica set; and a resource scheduler on the master node to:

determine whether the deployment specification includes a workload label for scheduling the application;

determine, in response to determining the deployment specification does not include the workload label, a workload ratio associated with the application in response to the pod specification and a schedule of the application based on the determined workload ratio;

determine, in response to the deployment specification including the workload label, the schedule based on the workload label; and schedule the application across worker nodes of the plurality of nodes within the container management system based on the determined schedule.

10. The container management system of claim 9, wherein the resource scheduler is to determine whether the workload is one of a computing optimized workload and a memory optimized workload.

11. The container management system of claim 9, wherein to determine the workload ratio, the resource scheduler is to determine a compute workload to memory workload ratio associated with the application as the workload ratio; and to determine the schedule of the application, the resources scheduler is to determine whether the determined compute workload to memory workload ratio is greater than or equal to a first ratio threshold and determine that the scheduling is to deploy the application as a computing optimized workload in response to the compute workload to memory workload ratio being greater than or equal to the first ratio threshold.

12. The container management system of claim 11, wherein to determine the schedule of the application the resource scheduler is to:

determine whether the determined compute workload to memory workload ratio is within a second ratio threshold and determine that the scheduling is to deploy the application as an elastic block store (EBS) workload in response to the compute workload to memory workload ratio being within the second ratio threshold.

13. The container management system of claim 12, wherein to determine the schedule of the application the resource scheduler is to determine that for scheduling is to deploy the application as a memory optimized workload in response to both the compute workload to memory workload ratio not being greater than or equal to the first ratio threshold and the compute workload to memory workload ratio not being within the second ratio threshold.

14. A method for scheduling an application in a container management system, comprising:
   receiving a deployment specification for operating an application within the container management system;
   determining whether the deployment specification includes a workload label for scheduling the application;
   in response to determining that the workload label is not included in the deployment specification:
      determining, by a resource scheduler of a master node that includes hardware, a workload ratio associated with the application;
      determining, by the resource scheduler, a type of workload for the application based on a comparison of the determined workload ratio to a threshold ratio; and
      based on the workload type, scheduling, by the resource scheduler, the application across a plurality of worker nodes within the container management system based on the determined schedule;
   in response to determining that the workload label is included in the deployment specification, determine the schedule of the application according to the workload label; and
   deploy, by the resource scheduler, the application in pods according to the schedule.

15. The method of claim 14, wherein the determining the type of workload further comprises determining whether the workload is one of a computing optimized workload and a memory optimized workload.

16. The method of claim 14, wherein
   the determining the workload ratio includes determining a compute workload to memory workload ratio associated with the application; and
   the determining the type of workload includes:
      determining whether the determined compute workload to memory workload ratio is greater than or equal to a first ratio threshold; and
      determining the workload type for scheduling the application as being a computing optimized workload in response to the compute workload to memory workload ratio being greater than or equal to the first ratio threshold.

17. The method of claim 16, wherein
   the determining the workload ratio includes determining whether the determined compute workload to memory workload ratio is within a second ratio threshold; and
   the determining the type of workload includes determining the workload type for scheduling the application as being an elastic block store (EBS) workload in response to the compute workload to memory workload ratio being within the second ratio threshold.

18. The method of claim 17, further comprising determining the workload type for scheduling the application as being a memory optimized workload in response to both the compute workload to memory workload ratio not being greater than or equal to the first ratio threshold and the compute workload to memory workload ratio not being within the second ratio threshold.

* * * * *